United States Patent
Sato et al.

(10) Patent No.: US 7,517,399 B2
(45) Date of Patent: *Apr. 14, 2009

(54) INK COMPOSITION FOR INK JET RECORDING, RECORDING METHOD AND RECORDED MATTER

(75) Inventors: Hironori Sato, Nagano-Ken (JP); Akira Mizutani, Nagano-Ken (JP); Shuichi Koganehira, Nagano-Ken (JP); Masahiro Yatake, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 96 days.

This patent is subject to a terminal disclaimer.

(21) Appl. No.: 11/598,550

(22) Filed: Nov. 13, 2006

(65) Prior Publication Data

US 2007/0159516 A1    Jul. 12, 2007

(30) Foreign Application Priority Data

Nov. 14, 2005    (JP) .............................. 2005-328766
Dec. 28, 2005    (JP) .............................. 2005-379373

(51) Int. Cl.
C09D 11/00    (2006.01)
C09D 11/02    (2006.01)
B41J 2/01    (2006.01)

(52) U.S. Cl. .............. 106/31.58; 106/31.43; 106/31.59; 106/31.75; 106/31.86; 106/31.89; 347/100

(58) Field of Classification Search ............... 106/31.58, 106/31.59, 31.86, 31.89, 31.43, 31.75; 347/100
See application file for complete search history.

(56) References Cited

U.S. PATENT DOCUMENTS

| | | | | |
|---|---|---|---|---|
| 5,141,556 A * | 8/1992 | Matrick | .................... | 106/31.58 |
| 5,356,464 A * | 10/1994 | Hickman et al. | .......... | 106/31.58 |
| 7,135,208 B2 * | 11/2006 | Kubota | ..................... | 106/31.86 |
| 7,229,489 B2 * | 6/2007 | Yatake | ..................... | 106/31.58 |
| 2004/0024086 A1 * | 2/2004 | Segawa et al. | .............. | 523/160 |
| 2005/0235870 A1 * | 10/2005 | Ishihara | .................. | 106/31.58 |
| 2006/0266260 A1 * | 11/2006 | Yatake | ..................... | 106/31.58 |
| 2007/0117882 A1 * | 5/2007 | Aoyama et al. | ............. | 523/160 |
| 2007/0263054 A1 * | 11/2007 | Yatake et al. | ............ | 106/31.86 |

FOREIGN PATENT DOCUMENTS

| | | |
|---|---|---|
| JP | 2005-194500 | 7/2005 |
| JP | 2005-307184 | 11/2005 |
| WO | WO 2006/043700 | * 4/2006 |

OTHER PUBLICATIONS

JPO computer English translation of JP 2005-194500 dated Jul. 21, 2005.
JPO computer English translation of JP 2005-307184 dated Nov. 4, 2005.

* cited by examiner

*Primary Examiner*—Helene Klemanski
(74) *Attorney, Agent, or Firm*—Ladas & Parry

(57) ABSTRACT

Disclosed is an ink composition for ink jet recording, which possesses excellent gloss and good color reproducibility on various recording media, especially printing paper for running-on. The ink composition for ink jet recording comprises at least a colorant, water, an alkanediol, and a surfactant, wherein the alkanediol comprises a water soluble 1,2-alkanediol and a water insoluble both terminal alkanediol.

15 Claims, 1 Drawing Sheet

INK COMPOSITION FOR INK JET RECORDING, RECORDING METHOD AND RECORDED MATTER

BACKGROUND OF THE INVENTION

1. Field of the Invention

The present invention relates to an ink composition for ink jet recording, which possesses excellent gloss and good color reproducibility on various recording media, especially on printing paper for running-on, and a method for ink jet recording using the ink-composition.

2. Background Art

Ink jet recording is a printing method wherein droplets of an ink are ejected and deposited on recording media, such as paper, to perform printing. An innovative advance of a recent ink jet recording technique has made it possible to realize the production of images having quality comparable to images produced by silver salt photography or images yielded by high-definition printing realized by offset printing. This trend has led to the development of inks for ink jet recording that can realize images having a high level of gloss comparable to the gloss of images produced by silver salt photography, using the so-called specialty papers which are recording media having a high level of gloss comparable to photographic paper, art paper and the like used in the field of silver salt photography and offset printing. Further, inks for ink jet recording which can realize image quality comparable to the image quality of images produced by silver salt photography even on plain paper, have also been developed.

Inks, which have been generally used for ink jet recording, are water-based inks that comprise water as a main component and a colorant and various additives. Regarding the colorant, the development of pigment-based inks has recently been forwarded because pigments are superior to dyes in weatherfastness properties such as lightfastness, gasfastness, waterfastness, and moisturefastness. For example, Japanese Patent Laid-Open No. 194500/2005 discloses a pigment-based ink having improved feathering or bleeding properties and excellent gloss on specialty papers that have been realized by using a polysiloxane compound as a surfactant and an alkanediol such as 1,2-hexanediol as a dissolution aid additive. Further, Japanese Patent Laid-Open No. 307184/2005 discloses that an ink, which has excellent ejection stability and can be evenly printed on recording media, can be produced by adding an alcohol having a specific chain length and an acetylene glycol surfactant to the ink.

The widespread use of techniques for forming images from digital data in recent years has led to an increased need for digital color proofs (DTPs) particularly in the field of printing, and an ink jet recording method has also become applied to DTPs. The color reproduction and stability reproduction of printed matters are required of DTPs. Accordingly, when proofs are prepared by the ink jet recording method, specialty paper for ink jet recording has been generally used.

In applications for color proof, however, ink jet recording on printing paper for running-on rather than specialty papers has been desired. Further, it is considered that proof cost can be significantly reduced if printed matter produced by ink jet recording directly on printing paper for running-on can be used as a final proof sample without use of any specialty paper.

The printing paper for running-on is a coated paper having on its surface a coating layer for receiving an oil-based ink. In the printing paper for running-on, however, the capability of the coating layer to absorb ink is disadvantageously poor. Therefore, when water-based pigment inks, which have been generally used in ink jet recording, are used, the penetrability of the inks into recording media (printing paper for running-on) is so low that feathering or bleeding or uneven coagulation sometimes occurs in images.

SUMMARY OF THE INVENTION

The present inventors have now found that, when ink jet recording is carried out on printing paper for running-on using a highly permeable ink comprising the above polysiloxane surfactant and 1,2-hexanediol as a dissolution aid for the surfactant, color reproduction is different between proofs and final printed matters although the feathering or bleeding property is improved. The present inventors have further found that, in a surfactant-containing ink composition for ink jet recording, the addition of two specific alkanediols as the dissolution aid for the surfactant can realize images having excellent gloss and, at the same time, having good feathering or bleeding properties and color reproducibility on various recording media, especially on printing paper for running-on. The present invention has been made based on such finding.

Accordingly, an object of the present invention is to provide an ink composition for ink jet recording that possesses excellent gloss and good feathering or bleeding property and color reproducibility on various recording media, especially on printing paper for running-on.

According to the present invention, there is provided an ink composition for ink jet recording, comprising at least a colorant, water, an alkanediol, and a surfactant, the alkanediol comprising a water soluble 1,2-alkanediol and a water insoluble both terminal alkanediol.

The present invention can provide an ink composition for ink jet recording that possesses excellent gloss and good color reproducibility on various recording media, especially on printing paper for running-on.

DETAILED DESCRIPTION OF THE INVENTION

Figure 1:
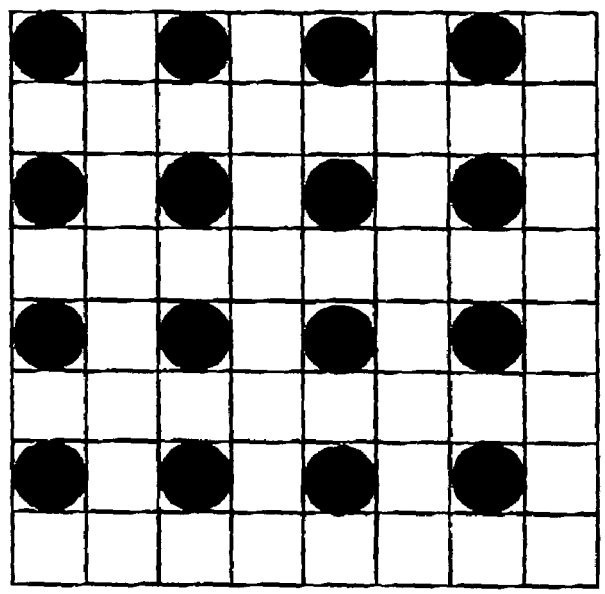
FIG. 1 is a schematic diagram showing dot layout i used in the working example.

The ink composition for ink jet recording according to the present invention comprises at least a colorant, water, an alkanediol, and a surfactant, the alkanediol comprising a water soluble 1,2-alkanediol and a water insoluble both terminal alkanediol. Individual ingredients will be described.

<Alkanediol>

The alkanediol used in the ink composition for ink jet recording according to the present invention comprises at least two alkanediols, that is, a water soluble 1,2-alkanediol and a water insoluble both terminal alkanediol. When these two alkanediols are used as a dissolution aid for the surfactant, images possessing excellent gloss and good color reproducibility can be realized on various recording media, especially on printing paper for running-on. The reason for this has not been elucidated yet but is considered as follows.

As described above, the conventional highly permeable ink for ink jet recording preferably contains 1,2-hexanediol and 4-methyl-1,2-pentanediol from the viewpoint of lowering the surface tension to improve the feathering or bleeding property. When only a straight chain alkanediol not containing a substituent such as 1,2-hexanediol is added, the viscosity of the ink is increased and, consequently, ink weight of dots is reduced. Accordingly, the ink weight of dots cannot be closely regulated. In this case, when the ink is ejected from the head, a shift in the impact position or misting of the ink or a failure of printing durability sometimes occurs. This results in lowered color development or collapsed dot shape. Therefore, in some cases, uneven coagulation or color-to-color bleeding occurs. Further, in some cases, a failure of printing occurs.

Further, when only a branched chain alkanediol such as 4-methyl-1,2-pentanediol or 3,3-dimethyl-1,2-butanediol is added, in some cases, uneven coagulation or a failure of drying occurs although an increase in ink viscosity can be suppressed. The reason for this has not been elucidated yet but is believed to be as follows.

Upon the deposition of ink droplets on a recording medium, a transient penetration period occurs in which the surfactant is selectively and preferentially penetrated into the recording medium and, consequently, the relative amount of the surfactant in ink droplets, which stay on the surface of the recording medium, is reduced. In this transient penetration period, it is considered that the surface tension of the ink is rapidly increased and, thus, ink, which remains unpenetrated, stays on the recording medium, resulting in the occurrence of coagulation spots or a failure of drying. In particular, when the conventional ink containing an alkanediol is applied to printing paper for running-on, the thickness of the ink receptive layer is so small that the amount of ink absorption into the recording medium is lower than the ink absorption amount in specialty paper for ink jet recording and, thus, the ink weight (coloring matter amount) based on 1 inch/m$^2$ is reduced, resulting in deteriorated color reproducibility.

In the present invention, when two specific alkanediols, that is, a water soluble 1,2-alkanediol and a water insoluble both terminal alkanediol, are added, even in a transient penetration period where the relative amount of the surfactant has been reduced, a rapid increase in surface tension can be suppressed. Further, the incorporation of a lipophilic water insoluble alkanediol can advantageously reduce a stay of ink by unsatisfactory penetration, the occurrence of coagulation spots and a failure of drying by virtue of the affinity for printing paper for running-on comprising an oil-based coating layer.

An ink composition containing a large amount of a water soluble penetrating agent such as an 1,2-alkanediol has significant penetrating properties on plain paper and thus sometimes exhibits poor color development. The deterioration in color development can be prevented by proper emulsified dissolution or complete dissolution of an oily matter such as a water insoluble both terminal alkanediol with the aid of a water soluble penetrating agent such as an 1,2-alkanediol. The reason why the deterioration in color development can be prevented by this method has not been fully elucidated yet but is believed to reside in that the water insoluble alkanediol as oily matter is selectively and preferentially penetrated into fibers constituting plain paper to swell the fibers and, consequently, the penetration of the pigment dispersed in the water soluble component into between fiber layers can be prevented.

In the present invention, the water soluble 1,2-alkanediol is preferably of a branched chain type. An 1,2-alkanediol having one or two substituents on its main chain is particularly preferred.

In the 1,2-alkanediol having one or two substituents on its main chain, the substituent is preferably an alkyl group, more preferably a C1 to C4 alkyl group. The carbon length of the alkanediol is preferably C3 to C8, more preferably C5 or C4. Specific examples of preferred 1,2-alkanediols include 4-methyl-1,2-pentanediol, 3,3-dimethyl-1,2-butanediol, 4,4-dimethyl-1,2-pentanediol, 4-methyl-1,2-hexanediol, and 5-methyl-1,2-hexanediol. Among them, 4-methyl-1,2-pentanediol and 3,3-dimethyl-1,2-butanediol are particularly preferred.

The content of the 1,2-alkanediol having one or two substituents on its main chain is preferably 0.5 to 20% by weight based on the whole ink composition, more preferably 1.5 to 12.0% by weight. When the content of this 1,2-alkanediol is in the above-defined range, as compared with an ink containing a substituent-free straight chain 1,2-alkanediol, the ink viscosity is lowered and, at the same time, an improvement in ejection stability and a reduction in uneven coagulation can be realized.

The water insoluble both terminal alkanediol is preferably of a branched chain type. A both terminal alkanediol having one or two substituents on its main chain is particularly preferred.

In the both terminal alkanediol having one or two substituents on its main chain, the one substituent or the two substituents are preferably alkyl groups, more preferably C1 to C4 alkyl groups. The two substituents may be an identical alkyl group or different alkyl groups. The carbon length of the alkanediol is preferably C3 to C8, more preferably C3. Specific examples of preferred both terminal alkanediols having one or two substituents on the main chain thereof include 2-methyl-2-propyl-1,3-propanediol, 2-ethyl-2-butyl-1,3-propanediol, 2-butyl-2-methyl-1,3-propanediol, 2-butyl-2-ethyl-1,3-propanediol, and 2,2-dibutyl-1,3-propanediol. Among them, 2-butyl-2-methyl-1,3-propanediol and 2-butyl-2-ethyl-1,3-propanediol are particularly preferred.

The content of the both terminal alkanediol having one or two substituents on its main chain is preferably 0.1 to 5.0% by weight, more preferably 0.3 to 3.0% by weight, based on the whole ink composition. When the content of the both terminal alkanediol having one or two substituents on its main chain is in the above defined range, the color reproducibility can be further improved.

In the present invention, the content ratio of the water soluble 1,2-alkanediol to the water insoluble both terminal alkanediol is preferably 3:1 to 30:1 on a weight basis. When the mixing ratio is in the above defined range, the water insoluble both terminal diol can be stabilized without separation in the ink composition. Further, when a substituent-free straight chain 1,2-hexanediol is used as the water soluble 1,2-alkanediol, the content ratio of the water soluble 1,2-alkanediol to the water insoluble both terminal alkanediol is preferably 10:1 to 30:1 on a weight basis. When the mixing ratio is in the above defined range, uneven coagulation can be further reduced.

In the present invention, preferably, in addition to the two alkanediols, a substituent-free straight chain 1,2-alkanediol is further incorporated. As described above, the water insoluble both terminal alkanediol having one or two alkyl substituents on its main chain is highly hydrophobic and is sparingly soluble in water. Accordingly, when the content of the water insoluble both terminal alkanediol having one or two alkyl substituents on its main chain is not less than 5.0% by weight, the ink viscosity is likely to increase. In the present invention, the addition of the substituent-free straight chain 1,2-alkanediol as a further additive can suppress an increase in ink viscosity while improving the color reproducibility. That is, the substituent-free straight chain 1,2-alkanediol functions as a solubilizing agent for the both terminal alkanediol having one or two alkyl substituents and, thus, the increase in ink viscosity can be suppressed by adding this substituent-free straight chain 1,2-alkanediol.

The content of the substituent-free straight chain 1,2-alkanediol is preferably about 1.0 to 15.0% by weight based on the total weight of the ink although it varies depending upon the addition amount of the both terminal alkanediol having one or two substituents.

The two alkanediols and substituent-free straight chain 1,2-alkanediol are preferably contained in a ratio of 3:1:30 to 30:1:1 on a weight basis. The total amount of these alkanediol is preferably 1.0 to 20.0% by weight, more preferably 8.0 to 12.0% by weight, based on the whole ink.

<Surfactant>

The ink composition for ink jet recording according to the present invention contains a surfactant as an indispensable ingredient. When the recording medium used has on its surface a resin coating receptive to ink, the use of a surfactant in the ink composition for ink jet recording can realize images having excellent gloss even on recording media, in which greater importance is attached to a glossy impression, for example, photographic paper. Even when a recording medium comprising a surface receptive layer provided with a coating layer for receiving an oil-based ink, for example, printing paper for running-on, is used, color-to-color bleeding can be prevented and, at the same time, reflected light-derived whitening caused by increasing the deposition amount of the ink can be prevented.

In the present invention, preferably, the surfactant has a dynamic surface tension of not more than 26 mN/m at 1 Hz, as measured in the form of an aqueous solution containing 20% by weight of glycerin, 10% by weight of 1,2-hexanediol, 0.1% by weight of the surfactant, and 69.9% by weight of water. When the surfactant having the above property is used, in recorded image formation, the capability of the ink to wet the surface of the recording medium can be enhanced and, thus, the penetrability of ink can be enhanced. The surface tension of the aqueous solution can be measured on a platinum plate, for example, with an automatic surface tension balance CBVP-Z (manufactured by Kyowa Interface Science Co., Ltd.). The measurement method, however, is not limited to this method.

In the present invention, organopolysiloxane surfactants are suitable as the surfactant that can realize the above surface tension. When the organopolysiloxane surfactant is used, the solubility of the surfactant in the ink can be improved by virtue of the presence of the two alkanediols. Accordingly, the occurrence of insolubles and the like can be suppressed, and, thus, ink compositions having better ejection stability can be realized.

Such surfactants may be commercially available products, and examples thereof. Include KF-353A, KF6017, X-22-6551 and AW-3 (all the above products being manufactured by The Shin-Etsu Chemical Co., Ltd.).

More preferably, the ink composition contains one or at least two compounds represented by formula (I) as the organopolysiloxane surfactant;

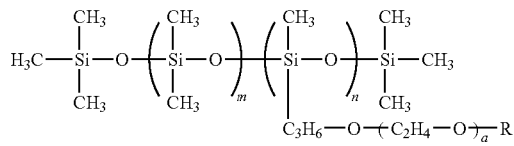

wherein R represents a hydrogen atom or a methyl group; a is an integer of 2 to 5; m is an integer of 20 to 40; and n is an integer of 2 to 4. When such specific organopolysiloxane surfactants are used, uneven ink coagulation can be further improved even in the case of printing on printing paper for running-on as a recording medium.

Regarding the compounds of formula (I), compounds wherein a is an integer of 2 to 5, m is an integer of 20 to 40, and n is an integer of 2 to 4, compounds wherein a is an integer of 7 to 11, m is an integer of 30 to 50, and n is an integer of 3 to 5, or compounds wherein a is an integer of 2 to 4, m is an integer of 2 to 4, and n is an integer of 1 or 2, are more preferred. Uneven coagulation of the ink can be further improved by using such compounds.

The content of the surfactant in the ink composition according to the present invention is preferably 0.01 to 2.00% by weight, more preferably 0.05 to 0.50% by weight. In particular, when the surfactant wherein R represents a methyl group is used, preferably, the content of the surfactant is larger than the case where the surfactant wherein R represents H is used.

Other surfactants, specifically acetylene glycol surfactants, anionic surfactants, nonionic surfactants, amphoteric surfactants and the like, may be further added to the ink composition according to the present invention.

Examples of acetylene glycol surfactants include 2,4,7,9-tetramethyl-5-decyne-4,7-diol, 3,6-dimethyl-4-octyne-3,6-diol, 3,5-dimethyl-1-hexyn-3-ol, or 2,4-dimethyl-5-hexyn-3-ol. Acetylene glycol surfactants may also be commercially available products. Examples thereof Include Olfine E1010, Olfine STG, or Olfine Y (tradename, manufactured by Nissin Chemical Industry Co., Ltd.) and Surfynol 61, Surfynol 104, Surfynol 82, Surfynol 465, Surfynol 485 or Surfynol TG (tradename, manufactured by Air Products and Chemicals Inc.).

<Organic Amine>

The ink composition for ink jet recording according to the present invention may further comprise an organic amine. In recorded image formation, the organic amine can enhance the capability of the ink to wet a recording face, for example, in recording media to enhance ink penetration, and, further, the pH value of the ink composition can easily be adjusted to a suitable range. Tertiary amines are preferred as the organic amine.

Tertiary amines include, for example, alkanolamines such as triethanolamine. Preferably, the ink composition according to the present invention has a pH value of 8 to 12, particularly preferably 8 to 10. When the pH value is in the above defined range, a deterioration in members, which come into contact with the ink, can be prevented.

The content of the organic amine based on the total weight of the ink composition is not less than 0.1% by weight. The organic amine content is preferably 0.1 to 2.0% by weight, more preferably 0.3 to 1.0% by weight, from the viewpoints of an enhancement in the capability of the ink to wet a recording face, for example, in recording media in recorded image formation to enhance ink penetration and, further, ink ejection stability and storage stability.

<Colorant>

Any of dyes and pigments may be used as the colorant in the ink composition for ink jet recording according to the present invention. However, pigments are preferred from the viewpoints of lightfastness and waterfastness.

Inorganic pigments and organic pigments are usable as the pigment. The inorganic pigments and the organic pigments may be used either solely or as a mixture of two or more. Inorganic pigments include, for example, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline blacks.

Pigments used may be properly selected depending upon the type (color) of the ink composition to be prepared. Examples of pigments for yellow ink compositions include C.I. Pigment Yellow 1, C.I. Pigment Yellow 2, C.I. Pigment Yellow 3, C.I. Pigment Yellow 12, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. They may be used either solely or in a combination of two or more. The use of one or at least two pigments selected from the group consisting of C.I. Pigment Yellow 74, C.I. Pigment Yellow 110, C.I. Pigment Yellow 128, and C.I. Pigment Yellow 147 is particularly preferred. Examples of pigments for magenta ink compositions include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, and C.I. Pigment Violet 19. They may be used either solely or in a combination of two or more. The use of one or at least two pigments selected from the group consisting of C.I. Pigment Red 122, C.I. Pigment Red 202, C.I. Pigment Red 209, and C.I. Pigment Violet 19 is particularly preferred. Examples of pigments for cyan ink compositions include C.I. Pigment Blue 1, C.I. Pigment Blue 2, C.I. Pigment Blue 3, C.I. Pigment Blue 15:2, C.I. Pigment Blue 15:3, C.I. Pigment Blue 15:4, C.I. Pigment Blue 15:34, C.I. Pigment Blue 16, C.I. Pigment Blue 22, and C.I. Pigment Blue 60; and C.I. Vat Blue 4 and C.I. Vat Blue 60. They may be used either solely or in a combination of two or more. The use of C.I. Pigment Blue 15:3 and/or C.I. Pigment Blue 15:4 is particularly preferred. C.I. Pigment Blue 15:3 is still more preferred. Examples of pigments for black ink compositions include inorganic pigments, for example, carbon blacks (C.I. Pigment Black 7) such as furnace black, lamp black, acetylene black, and channel black and iron oxide pigments; and organic pigments, for example, aniline black (C.I. Pigment Black 1).

In the present invention, preferably, the pigment is a pigment which has been kneaded with a dispersant which will be described later. However, pigments not subjected to surface treatment can also form excellent color images.

<Dispersant>

The ink composition according to the present invention preferably comprises a copolymer resin of a hydrophobic monomer and a hydrophilic monomer as a dispersant for dispersing a colorant. The copolymer resin is adsorbed to a pigment to improve the dispersibility of the pigment.

Specific examples of hydrophobic monomers include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol di-methacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimetylolpropane triacrylate, trimetylolpropane trimethacrylate, glycerol acrylate, glycerol methacrylate, styrene, methylstyrene, and vinyltoluene. They may be used either solely or as a mixture of two or more.

Specific examples of hydrophilic monomers include acrylic acid, methacrylic acid, maleic acid, and itaconic acid.

The copolymer resin of a hydrophobic monomer and a hydrophilic monomer is preferably at least any one of styrene-(meth) acrylic acid copolymer resins, styrene-methylstyrene-(meth)acrylic acid copolymer resins, styrene-maleic acid copolymer resins, (meth)acrylic acid-(meth)acrylic ester copolymer resins, and styrene-(meth)acrylic acid-(meth) acrylic ester copolymer resins, from the viewpoints of simultaneously satisfying color image gloss, bronzing prevention, and ink composition storage stability requirements and, at the same time, forming color images having better gloss.

The copolymer resin may be a resin (styrene-acrylic acid resin) comprising a polymer produced by reacting styrene with acrylic acid or an acrylic ester. Alternatively, the copolymer resin may be an acrylic acid-type water soluble resin. Alternatively, salts thereof, for example, sodium, potassium, or ammonium salts thereof, may also be used.

The content of the copolymer resin is preferably 10 to 50 parts by weight, more preferably 10 to 35 parts by weight, based on 100 parts by weight of the pigment, from the viewpoints of simultaneously satisfying color image gloss, bronzing prevention, and ink composition storage stability requirements and, at the same time, forming color images having better gloss.

Examples of surfactants which are preferred as dispersants include anionic surfactants such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants such as fatty acid amine salts, quaternary ammonium salts, sulfonium salts, and phosphoniums; and nonionic surfactants such as polyoxyethylene alkyl ethers, polyoxyethylene alkyl esters, sorbitan alkyl esters, and polyoxyethylene sorbitan alkyl esters. It is needless to say that the above surfactants, when added to the ink composition, can function also as a surfactant. In this case, however, the surfactant should be added so that the contact angle of the recording medium with the ink composition falls within the above defined range.

<Water and Other Ingredients>

The ink composition for ink jet recording according to the present invention comprises the above specific solvent and surfactant, other various additives and further contains water as a solvent. Water is preferably pure water obtained by ion exchange, ultrafiltration, reverse osmosis, distillation or the like, or ultrapure water. These waters, which have been sterilized, for example, by ultraviolet irradiation or by addition of hydrogen peroxide, are particularly preferred because it can prevent the growth of mold or bacteria in the ink composition for a long period of time.

Further, the ink composition according to the present invention preferably comprises a penetrating agent in addition to the above ingredients.

Glycol ethers are suitable as the penetrating agent.

Specific examples of glycol ethers usable herein include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. They may be used either solely or as a mixture of two or more.

Among the above glycol ethers, alkyl ethers of polyhydric alcohols are preferred. Particularly preferred are ethylene glycol monoethyl ether, ethylene glycol mono-n-butyl ether, diethylene glycol monoethyl ether, diethylene glycol monoethyl ether, diethylene glycol mono-n-butyl ether, triethylene glycol monomethyl ether, triethylene glycol monoethyl ether, or triethylene glycol mono-n-butyl ether. More preferred are triethylene glycol mono-n-butyl ether.

The addition amount of the penetrating agent may be properly determined but is preferably about 0.1 to 30% by weight, more preferably about 1 to 20% by weight.

Preferably, the ink composition according to the present invention further comprises a solubilizer for a recording medium in addition to the above ingredients.

Pyrrolidones such as N-methyl-2-pyrrolidone are suitable as the solubilizer for a recording medium. The addition amount of the solubilizer for a recording medium may be properly determined but is preferably about 0.1 to 30% by weight, more preferably about 1 to 20% by weight.

Preferably, the ink composition for ink jet recording according to the present invention comprises a wetting agent. Polyhydric alcohols are suitable as the wetting agent. Specific examples of polyhydric alcohols include glycerin, ethylene glycol, diethylene glycol, triethylene glycol, and trimetylolpropane.

The addition amount of the wetting agent may be properly determined but is preferably 0.1 to 30% by weight, more preferably about 1 to 20% by weight. It is apparent to a person having ordinary skill in the art that a part of the penetration solvent functions also as a wetting agent.

If necessary, other additives, for example, nozzle clogging preventives, preservatives, antioxidants, electric conductivity adjustors, pH adjustors, viscosity modifiers, surface tension modifiers, and oxygen absorbers, may be added to the ink composition according to the present invention.

For example, sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI) may be used as preservatives and antimolds.

Examples of pH adjustors, solubilizers, or antioxidants usable herein include: amines such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxides such as tetramethylammonium; salts of carbonic acid such as potassium carbonate, sodium carbonate, and lithium carbonate; salts of phosphoric acid, such as potassium phosphate, sodium phosphate, and lithium phosphate; N-methyl-2-pyrrolidone; urea compounds such as urea, thiourea, and tetramethylurea; allophanates such as allophanate and methyl allophanate; biurets such as biuret, dimethylbiuret, and tetramethyibiuret; and L-ascorbic acid and salts thereof.

The ink composition according to the present invention may contain an additional antioxidant and an ultraviolet absorber, and examples thereof include: Tinuvin 328, Tinuvin 900, Tinuvin 1130, Tinuvin 384, Tinuvin 292, Tinuvin 123, Tinuvin 144, Tinuvin 622, Tinuvin 770 and Tinuvin 292 manufactured by Ciba Specialty Chemicals, K.K.; Irgacor 252 and Irgacor 153; Irganox 1010, Irganox 1076, and Irganox 1035; MD 1024; and lanthanide oxides.

The ink composition according to the present invention can be produced by dispersing and mixing the above ingredients by a suitable method. Preferably, an ink solution is prepared by first mixing the pigment, the polymeric dispersant, and water together by a suitable dispergator, for example, a ball mill, a sand mill, an attritor, a roll mill, an agitator mill, a Henschel mixer, a colloid mill, an ultrasonic homogenizer, a jet mill, or an angmill to prepare a homogeneous pigment dispersion liquid, then adding, for example, separately prepared resins (resin emulsion), water, water soluble organic solvents, saccharides, pH adjustors, preservatives and antimolds, and satisfactorily dissolving the components. After the satisfactory stirring, the mixture is filtered for the removal of coarse particles and foreign matter causative of clogging to prepare a contemplated ink composition.

Method for Inkjet Recording

The method for ink jet recording according to the present invention comprises ejecting droplets of the ink composition and depositing the droplets onto a recording medium to perform printing. In this method, the ejected ink droplets are deposited onto the recording medium so that dots are superimposed on top of each other. In the recording method according to the present invention, preferably, printing paper for running-on is used as the recording medium. Even when the specific recording medium is used, images possessing excellent glossiness and good color reproduction can be realized.

Further, in the method for ink jet recording according to the present invention, preferably, droplets of the ink composition are ejected so that dots in a vertical direction are alternately arranged relative to a scanning direction of the recording head. In the formation of dots in this checked pattern, when the ink composition of the present invention is used, uneven coagulation can be significantly improved as compared with the conventional ink composition.

EXAMPLES

The following Examples further illustrate the present invention. However, it should be noted that the present invention is not limited to these Examples, <Preparation of Ink Compositions>

Ingredients were mixed together according to the formulations shown in Table 1, and the mixtures were filtered through a 10-μm membrane filter to prepare inks. The styrene-acrylic acid resin in the table is a copolymer having a molecular weight of 1600 and an acid value of 150,

TABLE 1

| Composition | | Example 1 Ink set 1 | | | | Example 2 Ink set 2 | | | | Example 3 Ink set 3 | | | | Example 4 Ink set 4 | | | | Example 5 Ink set 5 | | | |
|---|---|---|---|---|---|---|---|---|---|---|---|---|---|---|---|---|---|---|---|---|---|
| | | 1Y | 1M | 1C | 1B | 2Y | 2M | 2C | 2B | 3Y | 3M | 3C | 3B | 4Y | 4M | 4C | 4B | 5Y | 5M | 5C | 5B |
| Coloring material | C.I. Pigment Yellow 74 | 5.0 | — | — | — | 5.0 | — | — | — | 5.0 | — | — | — | 5.0 | — | — | — | 5.0 | — | — | — |
| | C.I. Pigment Red 122 | — | 5.0 | — | — | — | 5.0 | — | — | — | 5.0 | — | — | — | 5.0 | — | — | — | 5.0 | — | — |
| | C.I. Pigment Blue 15:4 | — | — | 5.0 | — | — | — | 5.0 | — | — | — | 5.0 | — | — | — | 5.0 | — | — | — | 5.0 | — |
| | C.I. Pigment Black 6 | — | — | — | 5.0 | — | — | — | 5.0 | — | — | — | 5.0 | — | — | — | 5.0 | — | — | — | 5.0 |
| Styrene-acrylic resin | | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Alkanediol | 4-Methyl-1,2-pentanediol | 15.0 | 15.0 | 15.0 | 15.0 | 8.0 | 8.0 | 8.0 | 8.0 | 1.5 | 1.5 | 1.5 | 1.5 | 8.0 | 8.0 | 8.0 | 8.0 | 8.0 | 8.0 | 8.0 | 8.0 |
| | 2-Butyl-2-methyl-1,3-propanediol | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | 1,2-Hexanediol | — | — | — | — | 1.5 | 1.5 | 1.5 | 1.5 | 8.0 | 8.0 | 8.0 | 8.0 | 1.5 | 1.5 | 1.5 | 1.5 | 1.5 | 1.5 | 1.5 | 1.5 |
| Surfactant | BYK 348 | 0.1 | 0.1 | 0.1 | — | 0.1 | 0.1 | 0.1 | 0.1 | 0.1 | 0.1 | 0.1 | — | — | — | — | 0.1 | — | — | — | — |
| | NONI 101 | — | — | — | — | — | — | — | — | — | — | — | — | — | — | — | — | — | — | — | — |
| | NONI 131 | — | — | — | 0.1 | — | — | — | — | — | — | — | 0.1 | 0.1 | 0.1 | 0.1 | — | 0.1 | 0.1 | 0.1 | 0.1 |
| Triethanolamine | | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| Glycerin | | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 |
| Pure water | | Balance | Balance | Balance | Balance | Balance | Balance | Balance | Balance | Balance | Balance | Balance | Balance | Balance | Balance | Balance | Balance | Balance | Balance | Balance | Balance |
| Total | | 100 | 100 | 100 | 100 | 100 | 100 | 100 | 100 | 100 | 100 | 100 | 100 | 100 | 100 | 100 | 100 | 100 | 100 | 100 | 100 |

| Composition | | Example 6 Ink set 6 | | | | Example 7 Ink set 7 | | | | Example 8 Ink set 8 | | | | Example 9 Ink set 9 | | | | Example 10 Ink set 10 | | | |
|---|---|---|---|---|---|---|---|---|---|---|---|---|---|---|---|---|---|---|---|---|---|
| | | 1Y | 1M | 1C | 1B | 2Y | 2M | 2C | 2B | 3Y | 3M | 3C | 3B | 4Y | 4M | 4C | 4B | 5Y | 5M | 5C | 5B |
| Coloring material | C.I. Pigment Yellow 74 | 5.0 | — | — | — | 5.0 | — | — | — | 5.0 | — | — | — | 5.0 | — | — | — | 5.0 | — | — | — |
| | C.I. Pigment Red 122 | — | 5.0 | — | — | — | 5.0 | — | — | — | 5.0 | — | — | — | 5.0 | — | — | — | 5.0 | — | — |
| | C.I. Pigment Blue 15:4 | — | — | 5.0 | — | — | — | 5.0 | — | — | — | 5.0 | — | — | — | 5.0 | — | — | — | 5.0 | — |

TABLE 1-continued

| | Example 11 Ink set 11 | | | | Example 12 Ink set 12 | | | | Example 13 Ink set 13 | | | | Example 14 Ink set 14 | | | |
|---|---|---|---|---|---|---|---|---|---|---|---|---|---|---|---|---|
| Composition | 4Y | 4M | 4C | 4B | 5Y | 5M | 5C | 5B | 4Y | 4M | 4C | 4B | 5Y | 5M | 5C | 5B |
| Coloring material: C.I. Pigment Yellow 74 | 5.0 | — | — | — | 5.0 | — | — | — | 5.0 | — | — | — | 5.0 | — | — | — |
| C.I. Pigment Red 122 | — | 5.0 | — | — | — | 5.0 | — | — | — | 5.0 | — | — | — | 5.0 | — | — |
| C.I. Pigment Blue 15:4 | — | — | 5.0 | — | — | — | 5.0 | — | — | — | 5.0 | — | — | — | 5.0 | — |
| C.I. Pigment Black 6 | — | — | — | 5.0 | — | — | — | 5.0 | — | — | — | 5.0 | — | — | — | 5.0 |
| Styrene-acrylic resin | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Alkanediol: 4-Methyl-1,2-pentanediol | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| 3,3-Dimethyl-1,2-butanediol | — | — | — | — | — | — | — | — | — | — | — | — | — | — | — | — |
| 2-Butyl-1,3-propanediol | — | — | — | — | — | — | — | — | — | — | — | — | — | — | — | — |
| 2-Butyl-2-ethyl-1,3-propanediol | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| 1,2-Hexanediol | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Surfactant: BYK 348 | 0.1 | 0.1 | 0.1 | 0.1 | — | — | — | — | 0.1 | 0.1 | 0.1 | 0.1 | — | — | — | — |
| NONI 101 | — | — | — | — | — | — | — | — | — | — | — | — | — | — | — | — |
| NONI 131 | — | — | — | — | — | — | — | — | — | — | — | — | — | — | — | — |
| Trietanolamine | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| Glycerin | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 |
| Pure water | Balance | Balance | Balance | Balance | Balance | Balance | Balance | Balance | Balance | Balance | Balance | Balance | Balance | Balance | Balance | Balance |
| Total | 100 | 100 | 100 | 100 | 100 | 100 | 100 | 100 | 100 | 100 | 100 | 100 | 100 | 100 | 100 | 100 |

TABLE 1-continued

| | | | | | | | | | | | Composition | | 6Y | Comparative Example 1 Ink set 15 6M | 6C | 6B | 7Y | Comparative Example 2 Ink set 16 7M | 7C | 7B |
|---|---|---|---|---|---|---|---|---|---|---|---|---|---|---|---|---|---|---|---|---|
| NONI 131 | — | — | — | 0.1 | 0.1 | 0.1 | 0.1 | 0.1 | 0.1 | 0.1 | Coloring material | C.I. Pigment Yellow 74 | 5.0 | — | — | — | 5.0 | — | — | — |
| Trietanolamine | 0.9 | 0.9 | 0.9 | 0.9 | 0.9 | 0.9 | 0.9 | 0.9 | 0.9 | 0.9 | | C.I. Pigment Red 122 | — | 5.0 | — | — | — | 5.0 | — | — |
| Glycerin | 12.0 | 12.0 | 12.0 | 12.0 | 12.0 | 12.0 | 12.0 | 12.0 | 12.0 | 12.0 | | C.I. Pigment Blue 15:4 | — | — | 5.0 | — | — | — | 5.0 | — |
| Pure water | Balance | Balance | Balance | Balance | Balance | Balance | Balance | Balance | Balance | Balance | | C.I. Pigment Black 6 | — | — | — | 5.0 | — | — | — | 5.0 |
| Total | 100 | 100 | 100 | 100 | 100 | 100 | 100 | 100 | 100 | 100 | Styrene-acrylic resin | | 2.0 | 2.0 | 2.0 | 2.0 | 2.0 | 2.0 | 2.0 | 2.0 |
| | | | | | | | | | | | Alkanediol | 4-Methyl-1,2-pentanediol | — | — | — | — | 15.0 | 15.0 | 15.0 | 15.0 |
| | | | | | | | | | | | | 2-Butyl-2-methyl-1,3-propanediol | — | — | — | — | — | — | — | — |
| | | | | | | | | | | | | 1,2-Hexanediol | 20.0 | 20.0 | 20.0 | 20.0 | — | — | — | — |
| | | | | | | | | | | | Surfactant | BYK 348 | 0.1 | 0.1 | 0.1 | 0.1 | 0.1 | 0.1 | 0.1 | 0.1 |
| | | | | | | | | | | | | NONI 101 | — | — | — | — | — | — | — | — |
| | | | | | | | | | | | | NONI 131 | — | — | — | — | — | — | — | — |
| | | | | | | | | | | | Trietanolamine | | 0.9 | 0.9 | 0.9 | 0.9 | 0.9 | 0.9 | 0.9 | 0.9 |
| | | | | | | | | | | | Glycerin | | 12.0 | 12.0 | 12.0 | 12.0 | 12.0 | 12.0 | 12.0 | 12.0 |
| | | | | | | | | | | | Pure water | | Balance | Balance | Balance | Balance | Balance | Balance | Balance | Balance |
| | | | | | | | | | | | Total | | 100 | 100 | 100 | 100 | 100 | 100 | 100 | 100 |

<Evaluation>
Viscosity of Ink

The inks prepared above were evaluated for viscosity. The viscosity of the inks was measured with a vibration-type viscometer (model MV100, manufactured by YAMAICHI ELECTRONICS CO., LTD,) at 20° C. The results were evaluated according to the following criteria.

A: A viscosity of not more than 6 Pa·s
B: A viscosity of more than 6 Pa·s

Uneven Ink Coagulation (1)

Among the inks prepared above, ink 1Y, ink 1M, ink 1C and ink 1B were loaded as ink set 1 into an ink cartridge in an ink jet printer (PX-G900, manufactured by Seiko Epson Corporation), and printing was carried out on OK Top Coat+ (manufactured by Oji Paper Co., Ltd.) as printing paper for running-on with a resolution of 1440×720 dpi or 1440×1440 dpi. In this case, regarding printing conditions, the discharge rate of the ink was regulated so that, In a method for recording in a single direction that a resolution of 720×180 dpi is provided by one drive of the recording head, the dot weight was 7 ng. The drive head was 200 cps.

The recorded matters thus obtained were evaluated for unevenness of ink coagulation according to the following criteria.

A: No uneven coagulation was observed with an ink weight of 4.4 mg/inch$^2$
B: No uneven coagulation was observed with an ink weight of 3.6 mg/inch$^2$
C: Uneven coagulation was observed with an ink weight of 3.6 mg/inch$^2$ Ink sets 2 to 16 were also evaluated for uneven coagulation in the same manner as described above. The results were as shown in Table 2.

Uneven Ink Coagulation (2)

The evaluation of uneven ink coagulation was carried out in the same manner as described above, except that printing conditions were changed as follows. Printing was carried out on OK Top Coat+ (manufactured by Oji Paper Co., Ltd.) as printing paper for running-on with a resolution of 720 dpi× 720 dpi. In this case, regarding printing conditions, the discharge rate of the ink was regulated so that, in a bi-directional recording method that a resolution of 760×180 dpi is provided by one drive of the recording head, the dot weight was 14 ng.

Ink sets 2 to 16 were also evaluated for uneven coagulation in the same manner as described above. The results were as shown in Table 2.

Uneven Ink Coagulation (3)

Figure 2:
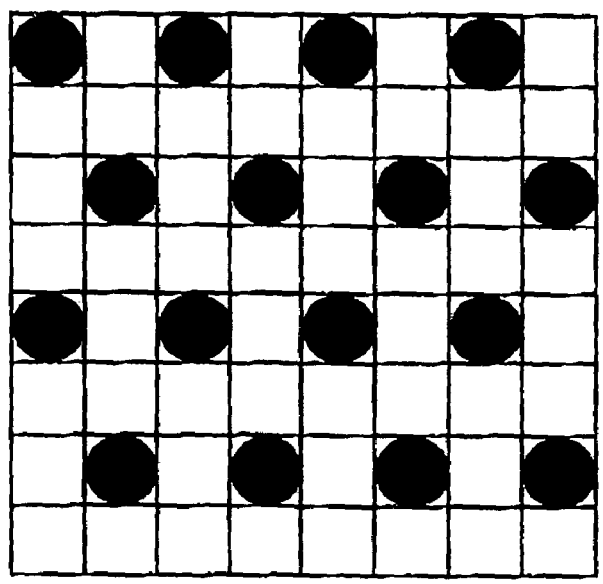
FIG. 2 is a schematic diagram showing dot layout ii used in the working example.

In the same manner as described above, printing was carried out with a resolution of 720 dpi×720 dpi on U-LITE (manufactured by Oji Paper Co., Ltd.) as printing paper for running-on using ink set 1. In this case, printing was carried out in dot layout i shown in FIG. 1 and dot layout ii shown in FIG. 2. In this case, regarding printing conditions, the ink set was loaded into an ink jet printer (PX-6200S, manufactured by Seiko Epson Corporation) so that a resolution of 760×360 dpi is provided by one drive of a recording head, and the discharge rate of ink was regulated so that, in a bi-directional recording method, the dot weight was 14 ng. One box shown in FIGS. 1 and 2 represents 1440 dpi.

Ink sets 2 to 16 were also evaluated for uneven coagulation in the same manner as described above. The results were as shown in Table 2.

Color Reproduction

Ink set 1 was loaded into an ink cartridge in the same ink jet printer as described above. "Futsushi Suisho, Kirei Modo (Plain Paper Recommended, Fine Mode)" was selected, and a full density blotted image was printed on Xerox P (manufactured by Xerox Corp.) with a resolution of 720×720 dpi under setting of "Without Gloss Optimizer." The printed matter was allowed to stand at 25° C. for 24 hr. The OD value of the recorded face was measured with SPM50 manufactured by Gretag Macbeth. The color reproducibility was evaluated according to the following criteria.

A: OD value of not less than 1.1
B: OD value of less than 1.1

Ink sets 2 to 16 were also evaluated for color reproducibility in the same manner as described just above. The results of evaluation were as shown in Table 2.

TABLE 2

|  | Ink viscosity | Unevenness of ink coagulation (1) | Unevenness of ink coagulation (2) | Unevenness of ink coag-ulation (3) (Layout i) | Unevenness of ink coag-ulation (3) (Layout ii) | Color reproducibility |
|---|---|---|---|---|---|---|
| Example 1 | B | A | B | B | A | A |
| Example 2 | A | A | B | B | A | A |
| Example 3 | B | A | B | B | A | A |
| Example 4 | A | A | A | A | A | A |
| Example 5 | A | A | A | A | A | A |
| Example 6 | B | A | B | B | A | A |
| Example 7 | A | A | B | B | A | A |
| Example 8 | B | A | B | B | A | A |
| Example 9 | A | A | A | A | A | A |
| Example 10 | A | A | A | A | A | A |
| Example 11 | A | A | A | A | A | A |
| Example 12 | A | A | A | A | A | A |
| Example 13 | A | A | A | A | A | A |
| Example 14 | A | A | A | A | A | A |
| Comparative Example 1 | B | B | C | C | B | B |
| Comparative Example 2 | A | B | C | C | B | B |

What is claimed is:

1. An ink composition for ink jet recording, comprising at least a colorant, water, an alkanediol, and a surfactant, the alkanediol comprising a water soluble 1,2-alkanediol having one or two substituents in its main chain, a water soluble straight chain 1,2-alkanediol and a water insoluble alkanediol having a hydroxyl group at both ends of its main chain.

2. An ink composition for ink jet recording according to claim 1, wherein the alkanediol having a hydroxyl group at both ends of its main chain has one or two substituents in its main chain.

3. The ink composition for ink jet recording according to claim 2, wherein the substituents for the 1,2-alkanediol or the alkanediol having a hydroxyl group at both ends of its main chain are each an alkyl group.

4. The ink composition for ink jet recording according to claim 1, wherein the content ratio of the 1,2-alkanediol having one or two substituents in its main chain to the alkanediol having a hydroxyl group at both ends of its main chain is 3:1 to 30:1 on a weight basis.

5. The ink composition for ink jet recording according to claim 1, wherein the content ratio of the 1,2-alkanediol having one or two substituents on its main chain to the alkanediol having a hydroxyl group at both ends of its main chain having two substituents in its main chain to the straight chain 1,2-alkanediol is 3:1:30 to 30:1:1.

6. The ink composition for ink jet recording according to claim 1, wherein the content of the straight chain 1,2-alkanediol is 1.0 to 15.0% by weight based on the total weight of the ink.

7. The ink composition for ink jet recording according to claim 1, wherein the surfactant has a dynamic surface tension of not more than 26 mN/m at 1 Hz as measured in the form of an aqueous solution containing 20% by weight of glycerin, 10% by weight of 1,2-hexanediol, 0.1% by weight of the surfactant, and 69.9% by weight of water.

8. The ink composition for ink jet recording according to claim 1, wherein the surfactant is a polyorganosiloxane surfactant.

9. The ink composition for ink jet recording according to claim 8, wherein the polyorganosiloxane comprises one or at least two compounds represented by the following formula:

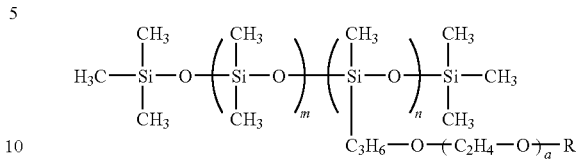

wherein R represents a hydrogen atom or a methyl group; a is an integer of 2 to 11; m is an integer of 2 to 50; and n is an integer of 1 to 5.

10. The ink composition for ink jet recording according to claim 1, which further comprises an organic amine.

11. The ink composition for ink jet recording according to claim 10, wherein the organic amine is a tertiary amine.

12. A method for ink jet recording, comprising the step of ejecting droplets of an ink composition and depositing the droplets onto a recording medium, wherein the ink composition is an ink composition for ink jet recording according to claim 1.

13. The method according to claim 12, wherein the recording medium is printing paper for running-on.

14. The method according to claim 13, wherein the droplets of the ink composition are ejected so that dots are alternately arranged in a vertical direction to the scanning direction of the recording head.

15. A recorded matter recorded by a method for ink jet recording according to claim 12.

\* \* \* \* \*